Nov. 23, 1937.  R. F. RUTHRUFF  2,099,755
TREATMENT OF HYDROCARBONS
Filed Dec. 13, 1934
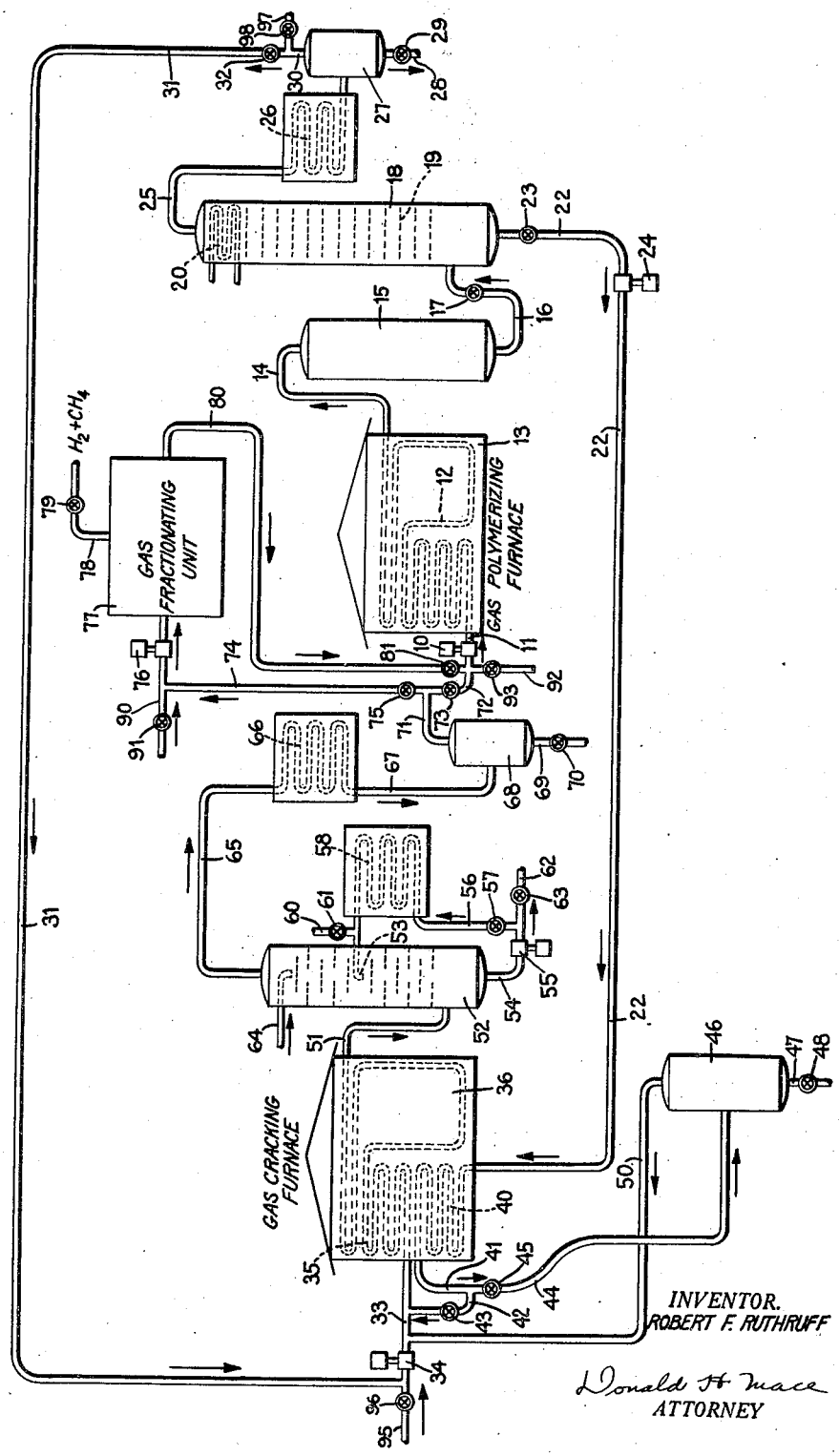
INVENTOR.
ROBERT F. RUTHRUFF
Donald H. Mace
ATTORNEY Patented Nov. 23, 1937

2,099,755

UNITED STATES PATENT OFFICE 2,099,755

TREATMENT OF HYDROCARBONS

Robert F. Ruthruff, Hammond, Ind., assignor to Standard Oil Company (Ind.), Chicago, Ill., a corporation of Indiana Application December 13, 1934, Serial No. 757,265

6 Claims. (Cl. 196—10)

My invention relates to the treatment of hydrocarbon gases and more particularly to the production of normally liquid hydrocarbons boiling within a motor-fuel boiling-point range from normally gaseous hydrocarbons.

Gaseous olefins, such as ethylene, butylene and propylene, and gases containing the same, may be utilized as a source of low-boiling normally liquid hydrocarbons by subjecting the gases to elevated temperatures under high pressure for a sufficient period of time to effect a polymerization of the gaseous olefins to hydrocarbons of higher molecular weight. In addition to liquid products boiling within a motor-fuel boiling-point range, however, and especially where polymerization is conducted under relatively high temperature, considerable amounts of polymerized products having higher boiling points than the desired motor-fuel product may be produced, and such higher-boiling products are ordinarily unsuitable for cracking to gasoline in the usual manner.

My invention therefore has for an object the provision of a gas-polymerizing process in which polymerized products heavier than the desired motor-fuel products may be cracked in a novel and advantageous manner for the production of further amounts of gaseous olefins suitable for polymerization, and my invention has for further objects such additional operative advantages and improvements as may hereinafter be found to obtain.

With such objects in view, my invention comprises subjecting hydrocarbon gases containing gaseous olefins to elevated temperature under high pressure to effect the polymerization of gaseous olefins to normally liquid products, fractionating the products to effect a separation of products boiling within a motor-fuel boiling-point range and higher-boiling products, and subjecting the higher-boiling products thus produced to a relatively high cracking temperature in the presence of hydrocarbon gases containing gaseous paraffins to produce gaseous olefins, the gaseous olefins thereby produced being subjected to polymerizing conditions of temperature and pressure to produce normally liquid products therefrom.

In its preferred embodiment, my invention contemplates a process in which hydrocarbon gases relatively rich in gaseous olefins are subjected to polymerizing conditions and resultant relatively high-boiling products are combined with residual gases from the polymerizing operation, relatively low in gaseous olefin content, for subjection to relatively high temperature gas-cracking operation. The gases thereby produced, after fractionation if desired to remove hydrogen and methane, are delivered to the gas-polymerizing step.

In order that my invention may be clearly set forth and understood, I now describe, with reference to the accompanying drawing, illustrating and forming a part of this specification, various preferred forms and manners in which my invention may be practiced and embodied.

In this drawing,

The single figure is a more or less diagrammatic elevational view of apparatus for carrying out my invention, the view being intended to serve primarily as a flow diagram of my process in a preferred embodiment thereof.

Referring now to the drawing, hydrocarbon gases relatively rich in olefins and preferably containing in excess of 50% by weight of gaseous olefins are introduced by means of a pump 10 and a line 11 to a coil 12 located within a suitable heating furnace 13, where they are subjected to elevated temperatures of, for example, from 800° to 1200° F. and preferably from 950° to 1100° F., under a pressure of from 500 to 3000 pounds per square inch or more, to effect a polymerization of gaseous olefins to normally liquid hydrocarbon oil. In the instance shown, the products pass from the coil 12 through a transfer line 14 to a soaking drum 15, the purpose of which is to insure that the gases undergoing polymerization are maintained under the desired conditions for a sufficient period of time to effect the desired degree of polymerization. While the reaction time will vary under different conditions, reaction times of the order of 100 seconds have been found suitable under ordinary conditions. From the soaking drum 15 the products pass through a line 16 having a valve 17 which may be used, if desired, to reduce the pressure on the products to the fractionator 18. The fractionator 18 may be of conventional design, as shown, having plates or trays 19 and cooling means such as a cooling coil 20 located in the upper part of the fractionating column. As the products pass through the fractionator 18 they are subjected to fractionation and partial condensation to effect a condensation and separation of constituents heavier than the desired motor-fuel product, for example, constituents boiling above about 400° F. The condensate thereby obtained is withdrawn from the bottom of the fractionator 18 through a line 22 having a valve 23 and a pump 24 while uncondensed vapors pass from the upper portion of the fractionator 18 through a vapor line 25 to a condenser 26 and a gas-separator 27. The polymerized gasoline is withdrawn from the separator 27 through a line 28 having a valve 29 while uncondensed gases are removed through a line 30.

According to my invention the condensate withdrawn from the bottom of the fractionating tower 18, or vaporizable portions thereof, is vaporized and commingled with paraffinic gases for subjection to relatively high gas-cracking temperatures in order to effect the production of gaseous olefins. In the preferred instance the gases employed for this purpose may comprise uncondensed gases withdrawn from the gas-separator 27, and which gases ordinarily contain some unpolymerized olefins together with gaseous paraffins not converted in the coil 12 and reaction chamber 15.

In this instance, gases from the separator 27 pass through the line 30 and a line 31 having a valve 32 to a line 33 wherein may be located a compressor or pump 34 to a coil 35 located within a suitable heating furnace 36, and wherein the gases are heated to a temperature of from 1250° to 1750° F. under a moderate pressure of from atmospheric to about 200 pounds per square inch to effect a conversion of gaseous paraffins to gaseous olefins. The condensate withdrawn from the fractionator 18 passes through the line 22 and is delivered by means of the pump 24 to a heating coil 40 which may also be located as shown in the furnace 36, and where the condensate is heated to a temperature merely sufficient to vaporize the same or to vaporize volatile portions thereof. Where the condensate thus withdrawn from the fractionator 18 is clean in character the vaporized condensate may then pass from the heating coil 40 through a line 41 and through a branch line 42 having a valve 43 directly to the line 33 and the coil 35 for conversion along with gaseous paraffins introduced into the coil 35 as heretofore described.

Where, however, the condensate withdrawn from the bottom of the fractionator 18 contains constituents which are too heavy to be introduced into the coil 35 without causing difficulty due to deposition of carbon therein the heated products from the heating coil 40 pass through the line 41 and through a branch line 44 having a valve 45 to a vaporizing chamber 46 which may, if desired, be maintained under a lower pressure than the pressure maintained in the coil 40 in order to further the volatilization of the vaporizable portion of the condensate. Relatively heavy portions of the condensate which are not vaporized in the chamber 46 are withdrawn therefrom through a line 47 having a valve 48 while the vaporous products pass through a line 50 to the line 33 and then into the coil 35. In any event, the polymerized products passing through the coil 35, together with gases, are subjected to a high cracking temperature therein with resultant production of gaseous olefins.

The hot products from the coil 35 then pass through a line 51 to a condenser-scrubber 52 wherein they are subjected to the action of a cool scrubbing oil such as gas oil introduced into the scrubber 52 through a line 53, and by means of which the gases and vapors are reduced in temperature, and heavy or tarry constituents are condensed in the scrubbing oil. A portion of the scrubbing oil may be vaporized during contact with the hot gases but, in any event, such portions of the scrubbing oil, together with condensate obtained from the gases, which have reached the lower portion of the scrubber 52 are withdrawn therefrom through a line 54, and a portion or all of the material thus withdrawn may be returned by means of a pump 55 and a line 56 having a valve 57 and a cooling coil 58 and by way of the line 53 into the upper portion of the scrubber 52. Where vaporization of the scrubbing oil tends to reduce the total amount of scrubbing oil in the cycle fresh scrubbing oil may be introduced through a line 60 having a valve 61. Alternatively, where the condensation of heavy constituents of the products in the coil 35 tends to increase the amount of scrubbing oil in the system extra scrubbing oil may be removed from the cycle through a line 62 having a valve 63. Clean reflux oil may be supplied, if desired, to the top of the scrubber 52 through a line 64.

Gaseous products thus freed from heavy constituents pass through a line 65 to a condenser 66 and through a line 67 into a separator 68 where any condensible oils not separated in the scrubber 52 are separated and withdrawn through a line 69 having a valve 70. Olefinic gases pass from the separator 68 through a line 71 either directly through a branch line 72 having a valve 73 to the pump 10 and then through the line 11 into the coil 12 or through a branch line 74 having a valve 75 and a pump 76 to a gas-fractionating unit 77, the purpose of which is to remove hydrogen and methane from the gases, and thus increase the olefinic content thereof.

In the figure, the gas-fractionating unit 77 is diagrammatically represented, and any suitable gas fractionating unit may be employed at this point, such, for example, as a conventional absorber type of stripper cycle through which a solvent preferably having selective properties with respect to olefins is recirculated. Hydrogen and methane are withdrawn from the gas-fractionating unit 77 through a line 78 having a valve 79 while olefinic gases from which hydrogen and methane have been separated pass through a line 80 having a valve 81 to the line 72 and then through the compressor 10 and the line 11 into the polymerizing coil 12 where they are subjected to polymerizing conditions, as aforesaid.

Fresh hydrocarbon gases for treatment according to my invention may be introduced at various points throughout the cycle described. Thus, for example, gases produced in the cracking of hydrocarbon oils may be introduced through a line 90 having a valve 91, passing first to the gas-fractionating unit and thence into the gas-polymerizing furnace. Where the content of gaseous olefins in the gases introduced is sufficiently high, for example, where these gases comprise substantially pure gaseous olefins or a mixture of gaseous olefins substantially uncontaminated with hydrogen and methane, such gases may be introduced into the gas-polymerizing furnace through a line 92 having a valve 93 and communicating with the line 72 for delivery into the coil 12. On the other hand, where gases to be introduced to the system contain relatively large quantities of gaseous paraffins as distinguished from gaseous olefins, such gases may first be passed through the gas-cracking coil 35. In this instance, such gases are introduced through a line 95 having a valve 96 and communicating with the line 33 leading to the coil 35. It will be obvious to those skilled in the art that the selection of the point at which fresh gases are introduced to the system will depend primarily upon the character of such gases, and particularly the relative contents of gaseous paraffins and olefins.

Where it is not desired to recirculate gases from the separator 27 such gases may be withdrawn from the system through a line 97 having a valve 98, in this instance, fresh gas for cracking in the coil 35 being supplied through the line 95.

It will further be obvious to those skilled in the art that while I have described my invention hereinabove with reference to various illustrative examples and details of operation my invention is not limited to such illustrative details and examples but may variously be practiced and embodied within the scope of the claims hereinafter made.

I claim:

1. The process of producing hydrocarbon oil boiling within the motor-fuel boiling-point range from hydrocarbon gases containing gaseous olefins which comprises subjecting said gases to an elevated temperature under high pressure to effect a polymerization of gaseous olefins to normally liquid products, fractionating the products to condense and separate products boiling within the motor-fuel boiling-point range and higher-boiling products, passing higher boiling products thus obtained through a heating zone and subjecting them to a temperature of from 1250° to 1750° F. under a relatively low pressure in the presence of hydrocarbon gases containing paraffins to produce gaseous olefins from said higher boiling products and paraffins, and delivering gaseous olefins thereby produced to the gas-polymerizing step.

2. The process of producing hydrocarbon oil boiling within the motor-fuel boiling-point range from hydrocarbon gases containing gaseous olefins which comprises subjecting said gases to an elevated temperature under high pressure to effect a polymerization of gaseous olefins to normally liquid products, fractionating the products to condense and separate products boiling within the motor-fuel boiling-point range, residual gases and higher-boiling products, passing higher-boiling products thus obtained through a heating zone and subjecting them to a temperature of from 1250° to 1750° F. under a relatively low pressure in the presence of said residual gases to produce gaseous olefins from said higher-boiling products and residual gases, and delivering gaseous olefins thereby produced to the gas-polymerizing step.

3. The process of producing hydrocarbon oil boiling within the motor-fuel boiling-point range from hydrocarbon gases containing gaseous olefins which comprises subjecting said gases to an elevated temperature under high pressure to effect a polymerization of gaseous olefins to normally liquid products, fractionating the products to condense and separate products boiling within the motor-fuel boiling-point range and higher-boiling products, passing higher-boiling products thus obtained through a heating zone and subjecting them to a temperature of from 1250° to 1750° F. under a relatively low pressure in the presence of hydrocarbon gases containing paraffins to produce gaseous olefins from said higher boiling products and paraffins, fractionating said olefins to separate hydrogen and methane therefrom, and delivering the thereby concentrated olefins to the gas-polymerizing step.

4. The process of producing hydrocarbon oil boiling within the motor-fuel boiling-point range from hydrocarbon gases containing gaseous paraffins which comprises passing said gases through a heating zone and subjecting them to a high cracking temperature under a relatively low pressure to effect a conversion of gaseous paraffins to gaseous olefins, fractionating the products to remove hydrogen and methane therefrom, subjecting the thereby concentrated olefins to a lower temperature under a relatively high pressure to effect a polymerization of gaseous olefins to normally liquid products, fractionating the products to condense and separate products boiling within the motor-fuel boiling-point range and higher-boiling products, volatilizing said higher-boiling products and returning them to the heating zone for admixture with said gases to be therein substantially converted to gaseous olefins.

5. The process of producing hydrocarbon oil boiling within the motor-fuel boiling-point range from hydrocarbon gases containing gaseous paraffins which comprises passing said gases through a heating zone and subjecting them to a high cracking temperature under a relatively low pressure to effect a conversion of gaseous paraffins to gaseous olefins, fractionating the products to remove hydrogen and methane therefrom, subjecting the thereby concentrated olefins to a lower temperature under a relatively high pressure to effect a polymerization of gaseous olefins to normally liquid products, fractionating the products to condense and separate products boiling within the motor-fuel boiling-point range and higher-boiling products, preheating said higher-boiling products to vaporize lighter constituents thereof and returning said vaporized constituents to the heating zone for admixture with said gases to be therein substantially converted to gaseous olefins.

6. The process of producing hydrocarbon oil boiling within the motor-fuel boiling-point range from hydrocarbon gases containing gaseous olefins which comprises subjecting said gases to a temperature of from 800° to 1200° F. under a pressure in excess of 500 pounds per square inch to effect a polymerization of gaseous olefins to normally liquid products, fractionating the products to condense and separate products boiling within the motor-fuel boiling-point range and higher-boiling products, passing higher boiling products thus obtained through a heating zone and subjecting them to a temperature of from 1250° to 1750° F. at a pressure below 200 pounds per square inch in the presence of hydrocarbon gases containing paraffins to produce gaseous olefins from said higher boiling products and paraffins, and delivering gaseous olefins thereby produced to the gas-polymerizing step.

ROBERT F. RUTHRUFF.